D. M. FERGUSON.
AUTOMOBILE GEARING.
APPLICATION FILED OCT. 18, 1913.
1,232,780.
Patented July 10, 1917.
3 SHEETS—SHEET 1.
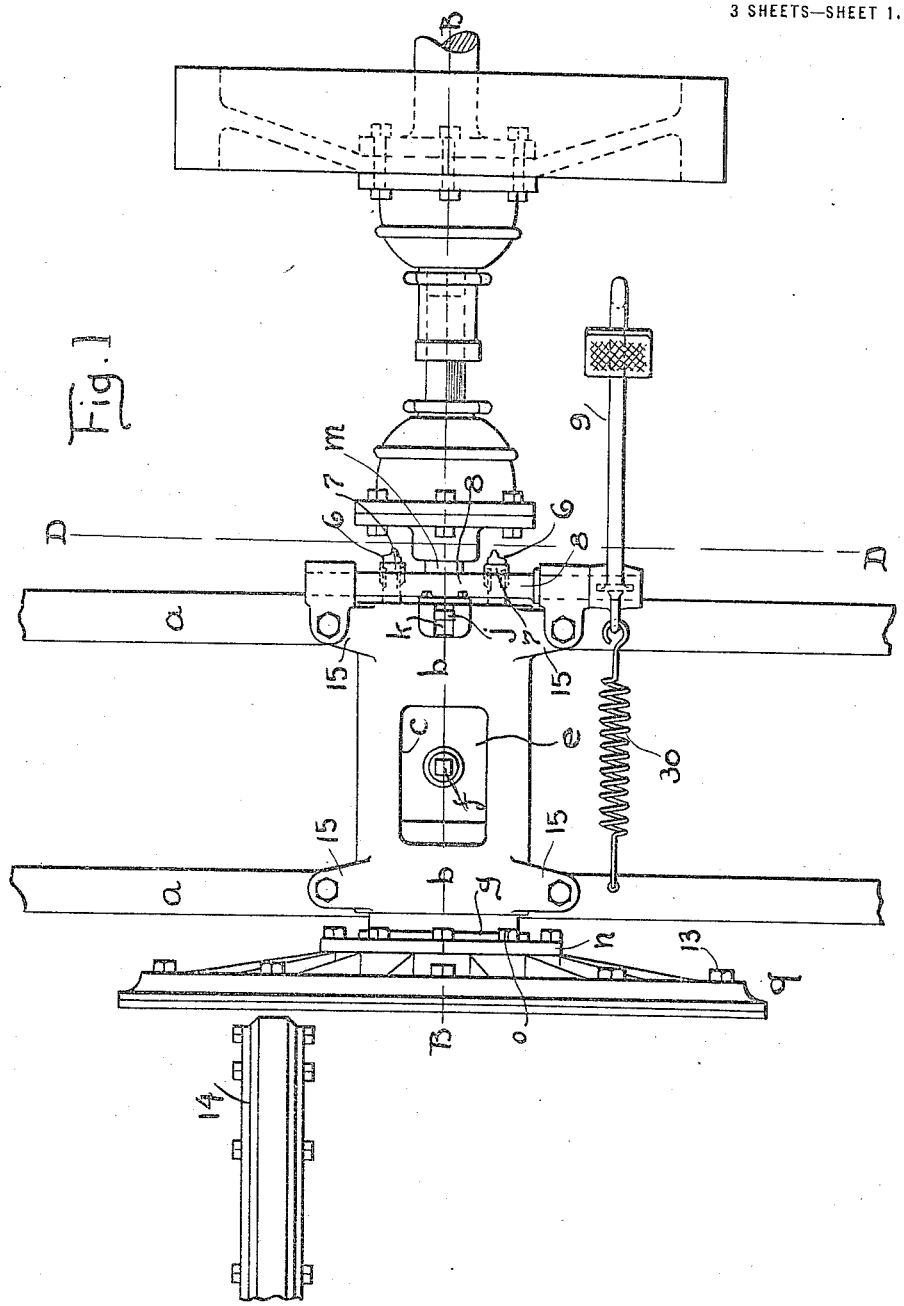
WITNESSES
INVENTOR
Donald M. Ferguson
BY
Raymond A. Parker
ATTORNEY

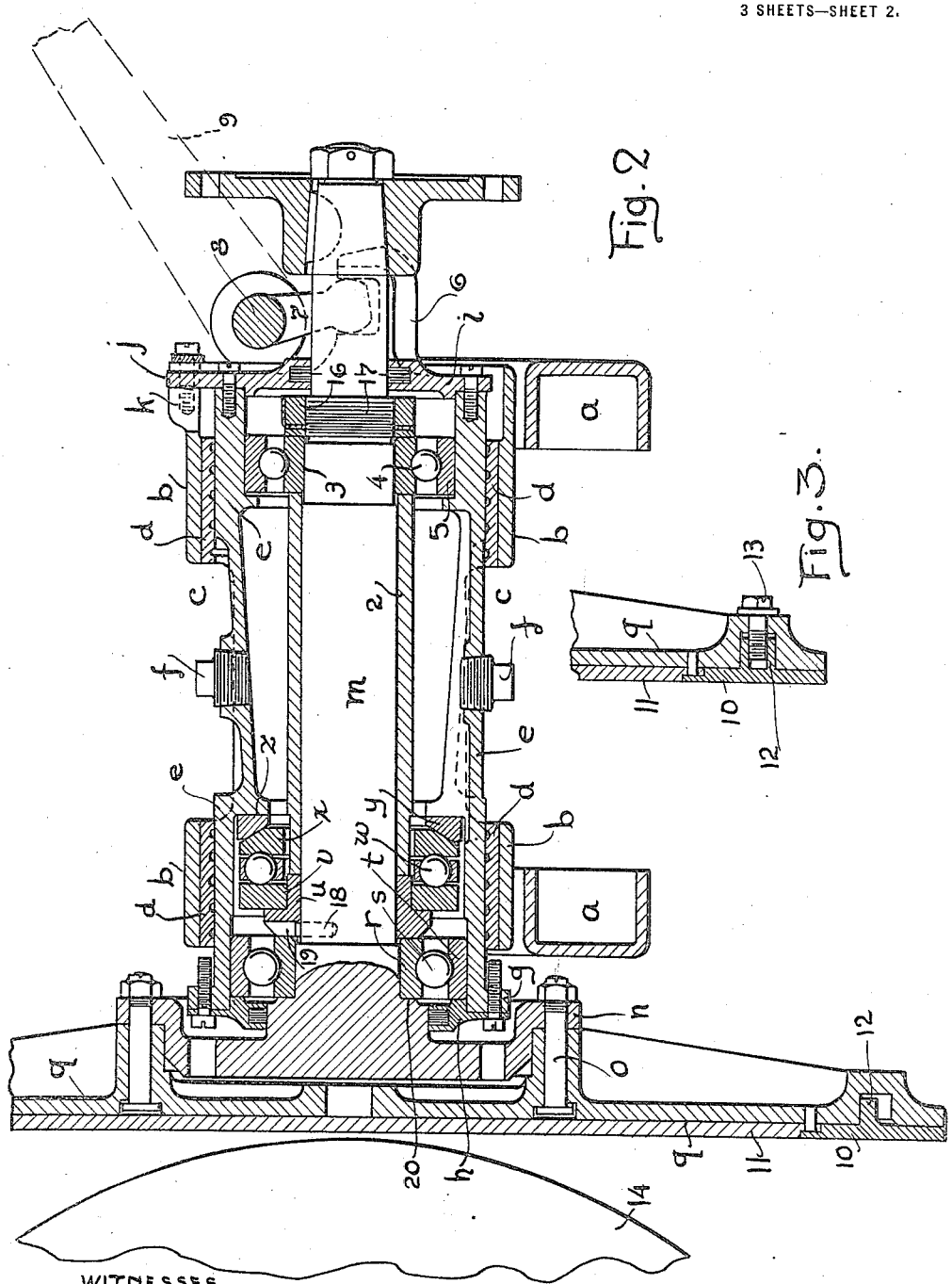

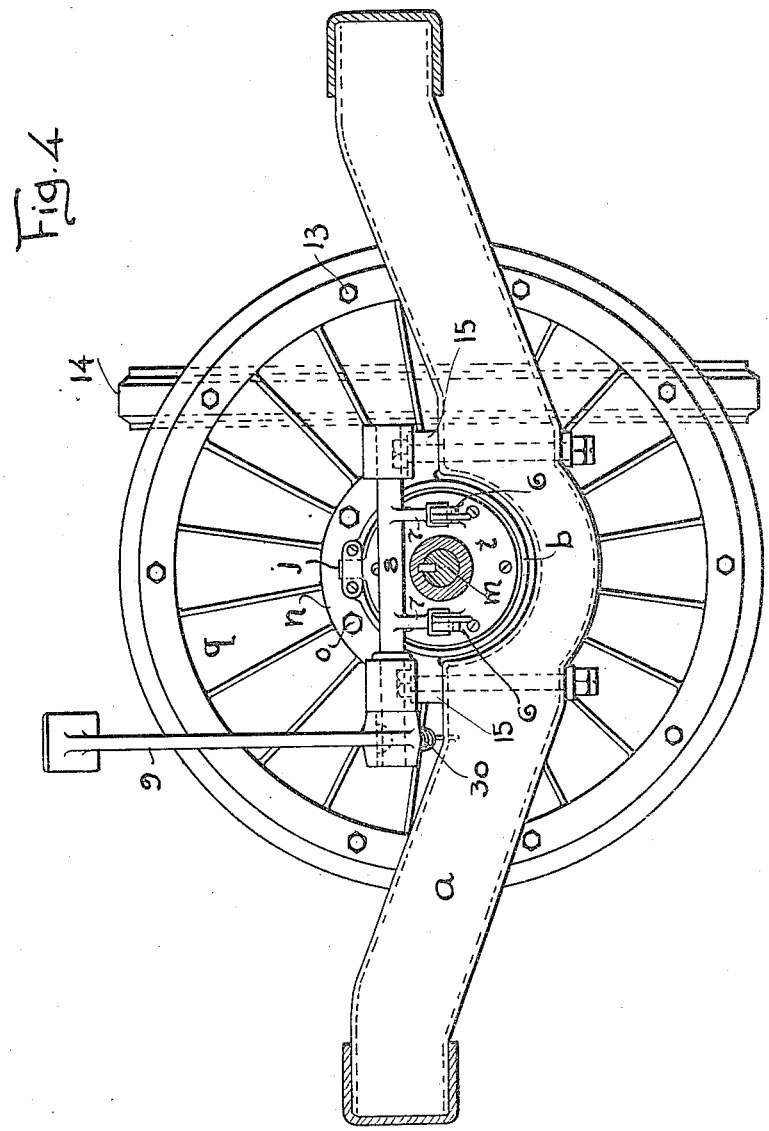

UNITED STATES PATENT OFFICE.

DONALD M. FERGUSON, OF DETROIT, MICHIGAN, ASSIGNOR TO GENERAL MOTORS COMPANY, OF DETROIT, MICHIGAN, A CORPORATION OF NEW JERSEY.

AUTOMOBILE-GEARING.

1,232,780.      Specification of Letters Patent.      Patented July 10, 1917.

Application filed October 18, 1913. Serial No. 795,849.

*To all whom it may concern:*

Be it known that I, DONALD M. FERGUSON, a citizen of the United States, residing at Detroit, county of Wayne, State of Michigan, have invented a certain new and useful Improvement in Automobile-Gearing, and declare the following to be a full, clear, and exact description of the same, such as will enable others skilled in the art to which it pertains to make and use the same, reference being had to the accompanying drawings, which form a part of this specification.

My invention relates to automobile gearing and a special object of my improvements is to provide an improved bearing and operating mechanism for the disk in a friction drive.

In the accompanying drawings:

Figure 1, is a plan view of an apparatus embodying my invention, and so much of an automobile as is necessary to illustrate its connection therewith.

Fig. 2, is a section on the line B—B Fig. 1.

Fig. 3, is a detail showing the mode of attachment of the frictional surface to the disk.

Fig. 4, is an elevation, the shaft and adjacent part being cut on the line D—D Fig. 1 and looking from the right of said line.

$a\ a$ are the cross-pieces extending between the side bars of the chassis. $b\ b$ are two supporting, or bearing, rings, united together by a web and secured by lugs 15—15—15—15 to the cross-pieces $a\ a$, at the center of said cross-pieces and where they are concaved to receive said bearings rings. $c$ indicates the opening cut through the web between the bearing rings $b\ b$. $d$ (Fig. 2) indicates the babbit or lining to the bearings $b\ b$. $e$ is an approximately cylindrical casing fitting into the rings $b\ b$ and adapted to slide longitudinally therein. The case $e$ is closed at one end by the annular plate $i$ which is provided with a radially extending lug $j$ which projects into a slot $k$ on a bearing ring $b$. The said case is thus prevented from rotation but is adapted to slide longitudinally. $h$ is an annular plate closing the other end of the casing $e$. This is secured by screws to a flange $g$.

$q$, is the friction disk. $m$ is the shaft to which the friction disk $q$ is secured and by which the latter is rotated. The shaft $m$ is located within and coaxial with the casing $e$ in which it is supported by ball bearings as hereinafter described. The shaft $m$ is enlarged at the end adjacent to the disk $q$ which enlargement provides a shoulder 20 on said shaft and is also provided with a flange $n$ to which the disk $q$ is secured by bolts $o\ o$. $r$ is a ring fixed upon the shaft $m$ against the shoulder 20 and forming the inner race for the balls $s$. $t$ is a ring slidably bearing in the case $e$ and forming the outer race for the balls $s$. The rings $r$ and $t$ with the intermediate balls $s$ form a ball bearing supporting the end of the shaft which is adjacent to the disk $q$ in the corresponding end of the casing $e$.

$u$ is a shouldered ring upon the shaft $m$ contiguous to the ring 20. There is a slot 19 in the ring $u$ through which a pin 18 extends engaging in a radial hole in the shaft $m$, as indicated in Fig. 2.

$v$ is a ring sleeved upon the ring $u$ and bearing against the shoulder thereof. The ring $v$ forms one race of a thrust ball bearing. $x$ is a ring surrounding the shaft $m$ and forming the other race of said thrust bearing. $w$ indicates the balls between the rings $u$ and $x$. $z$, is a shoulder on the casing $e$ extending around the interior thereof. The ring $x$ is turned off as indicated at Fig. 2 so as to form a part of the surface of a sphere having its center at the center of the ball bearing $r\ t$. $y$, is a ring bearing against the shoulder $z$ and having a corresponding spherical surface fitting against the surface of the ring $x$.

2, is a sleeve upon the shaft $m$, one end bearing against the shouldered ring $u$. 3, is a ring passing around the shaft $m$ and movably bearing thereon toward the end opposite to that at which the disk $q$ is secured. The ring 3 forms the inner race of a radial ball bearing. 5, is a ring passing around the ring 3 and forming the outer race of the bearing of which 3 forms the inner race. 4, indicates the balls between the races 3 and 5.

17, indicates screw threads cut upon the shaft $m$. 16 is a nut, its threads engaging the screw threads 17 and its inner face engaging the ring 3 through spacing rings or directly.

6, 6 are lugs having notches therein extending from and integral with the plate $i$. 8, is a rock shaft. 7, 7 are arms extending from the rock shaft 8 and engaging in the notches of the lugs 6, 6. 9, is a foot lever by which the shaft 8 may be rocked. By rocking the shaft 8 the casing *e* is caused to slide in its bearings in the rings *b b* to cause the disk *q* to engage the wheel 14 or to disengage it therefrom.

The annular plates *i* and *h* are provided with packing rings or gaskets fitting closely against the surface of the shaft *m* to prevent the entrance of dust into said casing, or the leakage of lubricant therefrom.

*f f* are plugs adapted to close holes in the wall of the casing *e* which holes are for the purpose of inserting oil or draining out the contents of the casing.

11, represents a plate forming a frictional surface which is secured to the disk *q* by means of a ring 10, the inner edge of which passes over the outer edge of the plate 11 and dowel pins engaging said disk and plate. 12 indicates lugs extending from the ring 10 into apertures toward the periphery of the frictional wheel *q* (Fig. 3). 13, represents bolts passing through the disk *q* and engaging in screw threaded apertures in the lugs 12 to hold said ring in place.

The engaging surfaces of the rings *x*, *y* form a ball and socket joint and facilitate the adjustment and assembling of the bearings.

30, is a spring adapted to retract the rock shaft 8.

What I claim is:

1. In an apparatus of the kind described, a bearing, a casing adapted to reciprocate in said bearing, a shaft *m* in said casing, a friction disk secured to one end of said shaft, radial bearings between said shaft and casing at each end of said casing, and a thrust bearing located between said radial bearings, said casing being adapted to contain lubricating oil and provided with means for supplying the same thereto.

2. In an apparatus of the kind described, a friction disk, a shaft therefor, a casing adapted to reciprocate longitudinally thereof, and a bearing for said shaft in said casing, said casing being adapted to form a reservoir for lubricating material and provided with means for supplying such material thereto.

3. In an apparatus of the kind described, a friction disk, a shaft therefor, a casing adapted to reciprocate longitudinally therewith, and a bearing for said shaft in said casing, said casing being adapted to form a reservoir for lubricating material and to supply the same to the relatively moving contiguous surfaces.

4. In an apparatus of the kind described, a bearing, a casing adapted to reciprocate in said bearing, a shaft *m* in said casing, a friction disk secured to one end of said shaft, radial bearings between said shaft and casing at each end of said casing, a thrust bearing intermediate said radial bearings and positioned between the shaft and casing, and universal supporting structure interposed between the thrust bearing and casing.

In testimony whereof, I sign this specification in the presence of two witnesses.

DONALD M. FERGUSON.

Witnesses:
VIRGINIA C. SPRATT,
ELLIOTT J. STODDARD.